US 8,106,903 B2

(12) United States Patent
Steinbock et al.

(10) Patent No.: US 8,106,903 B2
(45) Date of Patent: Jan. 31, 2012

(54) SYSTEM AND METHOD FOR VISUALLY REPRESENTING A PROJECT USING GRAPHIC ELEMENTS

(75) Inventors: William Steinbock, Crestwood, KY (US); Barry Bentley, Elverson, PA (US); Gino Cortesi, Honey Brook, PA (US)

(73) Assignee: Bentley Systems, Incorporated, Exton, PA (US)

( * ) Notice: Subject to any disclaimer, the term of this patent is extended or adjusted under 35 U.S.C. 154(b) by 1672 days.

(21) Appl. No.: 11/417,987

(22) Filed: May 4, 2006

(65) Prior Publication Data

US 2007/0257938 A1 Nov. 8, 2007

(51) Int. Cl.
*G06F 17/00* (2006.01)

(52) U.S. Cl. ........................................ 345/418

(58) Field of Classification Search .................. None
See application file for complete search history.

(56) References Cited

U.S. PATENT DOCUMENTS

| | | | | |
|---|---|---|---|---|
| 5,586,239 A * | 12/1996 | Ueda | ............................. | 715/207 |
| 5,798,752 A * | 8/1998 | Buxton et al. | ................ | 715/863 |
| 6,425,120 B1 * | 7/2002 | Morganelli et al. | ............. | 717/109 |
| 7,068,834 B1 * | 6/2006 | Ikeda et al. | .................... | 382/145 |
| 7,490,296 B2 * | 2/2009 | Feldman et al. | ............... | 715/780 |
| 7,668,379 B2 * | 2/2010 | Vienneau | ........................ | 382/226 |
| 7,814,439 B2 * | 10/2010 | Fitzmaurice et al. | .......... | 715/856 |

OTHER PUBLICATIONS

"The Settings Manager—Part 1," Feb. 21, 2001, pp. 1-6.
"The Settings Manager—Part 2," Feb. 21, 2001, pp. 1-5.
"MicroStation V8: 2004 Edition," User Guide, Bentley Systems, Incorporated, 2004, pp. 1-927.

* cited by examiner

*Primary Examiner* — Said Broome
(74) *Attorney, Agent, or Firm* — Cesari and McKenna, LLP (57) ABSTRACT

An element template system allowing users to define a named set of element symbology properties to be associated with a graphic element is provided. When the element template is active, it sets the active drawing settings to match the template and associates newly created elements with the active template. Once elements are associated with an element template, the template can be used for checking for compliance with a graphics standards for that project. The element templates technology can be used to update elements and existing files to match a specific set of template properties. The element templates defining a particular graphic element are stored in the same design file as that graphic element so that when the graphic element design file is transported the element templates are also transported with the file, thereby eliminating a need to be coupled to a database or other form of external data.

14 Claims, 7 Drawing Sheets

Element Template Path - Architectural\Walls\8" CMU

Level[0]=Interior Wall
Level[1]=Exterior Wall
Weight[0] = 0
Weight[1] = 2
Color[0] = [0, 255, 0]
Color[1] = [255, 0, 0]
Color[2] = [0, 0, 255)
Multiline[0] = 8" CMU

Element Template Path - Architectural\Walls\8" CMU

| | |
|---|---|
| Level[0]=Interior Wall | criteria="Wall.Classification = 'Interior'" |
| Level[1]=Exterior Wall | criteria="Wall.Classification = 'Exterior'" |
| Weight[0] = 0 | criteria="Wall.BearingWall = False" |
| Weight[1] = 2 | criteria="Wall.BearingWall = True" |
| Color[0] = [0, 255, 0] | criteria="Wall.State = 'Existing'" |
| Color[1] = [255, 0, 0] | criteria="Wall.State = 'ForRemoval'" |
| Color[2] = [0, 0, 255] | criteria="Wall.State = 'New'" |
| Multiline(0] = 8" CMU | |

SYSTEM AND METHOD FOR VISUALLY REPRESENTING A PROJECT USING GRAPHIC ELEMENTS

BACKGROUND OF THE INVENTION

1. Field of the Invention

This invention relates to computer-aided design (CAD) systems and in particular graphic symbology for graphic elements in such systems.

2. Background Information

Creating designs and managing information for buildings, civil engineering projects, transportation systems, process plans, discreet manufacturing facilities, utilities and telecommunications networks can be accomplished more readily using computer-aided design (CAD) software. Robust CAD systems used for the design and management of architecture, engineering and construction (AEC) projects employ pre-defined graphic symbology to represent each particular graphic element, which in turn, represents actual items or components within the engineering system or structure being designed. Graphic symbology referred to herein as simply "symbology" are properties used to define the graphic presentation of an element. Typical symbology properties include color, line thickness (also referred to as line weight), line style (i.e. solid, dashed, dotted, etc.). Further types of symbology properties are discussed later in this document. Some CAD systems only store symbology definitions in external files or database tables disconnected from the geometry, in those systems the combination of geometry and symbology definition is used to display a graphic element.

Clients, such as companies and governmental entities, often have standards to be followed by architects and designers so that each of the drawings for the design adhere to the same standard leading to a uniform presentation of the components and systems across the various vendors, subcontractors and designers that are involved in the project. A set of symbology properties to be followed for a particular client, project or user is referred to herein as a "graphic standard" for that project.

CAD systems typically employ user interfaces which allow an engineer or designer to manipulate lines, shapes, text and symbols which represent actual components of the system being modeled. Many CAD systems define symbology "by level". The "by level" symbology assign common symbology properties to a level, and then any graphic elements placed on that level inherits its symbology from the level. The common symbology properties that are typically defined "by level" include color, line weight and line style. Other CAD systems, such as MicroStation, can use level as just another symbology property of a graphic element.

Symbology is an important concept in CAD since it is the way a user can discern the meaning of one graphic element from another. This makes complying with the symbology rules defined in a graphics standard critical to the project. The subsequent examples show how the level and color symbology properties can be used within a CAD drawing. Drawing levels, or layers, can be exposed or suppressed depending upon the user's selection. For example, in an architectural drawing, exterior walls can be assigned to the first level and interior walls can be assigned to the second level such that both levels can be displayed in the user interface at once or one or the other level can be displayed, allowing the user to view the external and internal walls independently. The drawing level is thus a symbology property that a graphic element will have. Thus, graphic elements that represent the same real world component may be displayed in one particular color. For example, 8" concrete masonry unit (CMU) walls may appear in the color red, while all 12" CMU walls may be shown in blue, according to a graphic standard for a particular architectural project. Thus, colors, like other symbology properties of graphic elements that can be used to denote different real world components.

Some CAD systems define named sets of symbology properties that include not only level, color, line weight and line style but also properties, such as, symbol name, text font, text size, hatch spacings and the like. These systems do not provide a way to associate a named set of symbology to a specific graphic element. In other words, there is no functionality in the software for explicitly linking or inferring a relationship between the graphic element and a named set of symbology properties that are defined for a particular user, a particular project, or corporate graphic standards. Furthermore, as will be understood by those skilled in the art, that there are typically no provisions for associating the same named symbology sets to graphic elements produced by different CAD systems. Because of this limitation the ability to have a quick technique for recognizing associations between graphic elements named sets of symbology properties to assist in maintaining graphics standards across the various CAD systems does not exist.

Some commercially available CAD systems employ "feature-coded" symbology which allows a particular graphic element to be tagged with a feature code which means that a particular feature is associated with such an element. This feature code is then essentially a pointer to an associated database table which contains the particular desired symbology for that type of component. However, these feature-coded designs allow one set of symbology properties per feature type. Thus, a range for one or more of the symbology properties cannot be specified using feature-coding. In addition, in feature coded systems since the definitions are external to the file containing the graphic elements there is no direct relationship between a symbology definition and a feature coded graphic element.

As noted, many CAD systems operate in conjunction with an associated database which contains all of the information about the attributes of the physical components of the system and the graphic symbology properties that are associated with each such attribute of the physical components. As this information is available only in the associated database this means that this database must be accessible in order to utilize the information. Thus, in a GIS environment or when a handheld PDA is being used in the field, where direct connections or even wireless service is not available, there may not be a way to connect to the database and thus the symbology information in the database is not accessible by that program.

Furthermore, even if the CAD system does have access to the database, and includes the feature coding function each graphic element is typically tied to a particular set of valid symbologies. Thus, a range or choice of symbologies is not typically available to the user through the commercially available user interfaces. Symbology definitions for graphic elements typically can not be managed at the property level in such systems. This limitation inhibits the ability of the CAD system to check graphic elements for compliance with an applicable graphic standard and allow non-compliant graphics to be corrected.

There remains a need therefore, for a system that can be used with a CAD software platform that allows a relationship to be persisted between a graphic element and a named set of graphic symbology properties that adhere to a defined graphic standard. There remains a further need for such a technology which provides a flexible way to configure the set of files that define these graphic standards so that these files can be protected, yet can be easily edited when changes are desired. There remains yet a further need for a technology that allows CAD users to easily create graphics that comply with properties defined in graphic standards, check existing drawings for compliance, and allow for correction of elements that are not compliant.

SUMMARY OF THE INVENTION

These and other disadvantages of the prior techniques are overcome by the present invention which provides a computer software program comprising instructions for configuring a system for creating a named set of graphic element symbology properties, referred to herein as an "element template." The element template system can be used with a suitable CAD platform. An element template in accordance with the invention is a set of symbology properties that define the display properties for a particular graphic element stored in a CAD drawing file. An Element Template may define zero, one, or a range of values for any symbology property it supports. The properties may conform to a predetermined graphic standard. Element templates allow a full set of properties to be associated with a particular graphic element. The properties can be defined based upon user selection, graphic standards of a company or governmental entity, or otherwise as desired in particular application of the invention. The element template system of the present invention can be used to create new elements using an active element template. In addition, the element template system can be used to perform select and query functions, in which a user selects graphic elements for manipulation or display by specifying one or more element templates. Further more, the element template system includes a feature where graphic elements may be checked to determine whether they comply with applicable graphics standards and to allow elements that are found to be out of compliance to be fixed and brought back into compliance.

Further in accordance with the invention, a user can select a set of graphic elements and chooses a template to apply. When the element template is applied, the selected elements are updated to match the properties defined in the template. This allows the user to quickly assure that existing drawing files comply with a given set of graphic standards. Any graphic element that matches any combination of properties specified in a template is thus associated with the template that provides those properties. In addition, the element templates can limit valid combinations by providing criteria expressions to each property value. The criteria expression can be based on any physical property of the element of any set of attributes available for the element. Element templates can be used to recognize graphic elements in a design file and subsequently associate them to a template, which in turn adds intelligence to the design file. This allows existing drawings originated using one software program to be imported into a system using a different software program.

Element templates are stored in libraries known as DGN-LIB files that store both the templates and the graphic element information. Security measures can be taken to protect these libraries. These DGNLIB files that contain element templates can be made available at a site, project or user level by properly configuring the workspace configuration variables in the associated CAD system. In addition, an element template is also copied into the active design file when a graphic element associated with the element template is created and written to the file. The design file element templates are retrievable and transportable as normal files and the information contained therein travels with the file, thus there is no requirement that a separate database must be accessible in order to retrieve needed information in the element template or determine the association between graphic element and its associated element template since they both exist in the same file.

BRIEF DESCRIPTION OF THE DRAWINGS

The above and further advantages of the invention can be better understood with reference to the accompanying drawings in which.

DETAILED DESCRIPTION OF AN ILLUSTRATIVE EMBODIMENT

Figure 1:
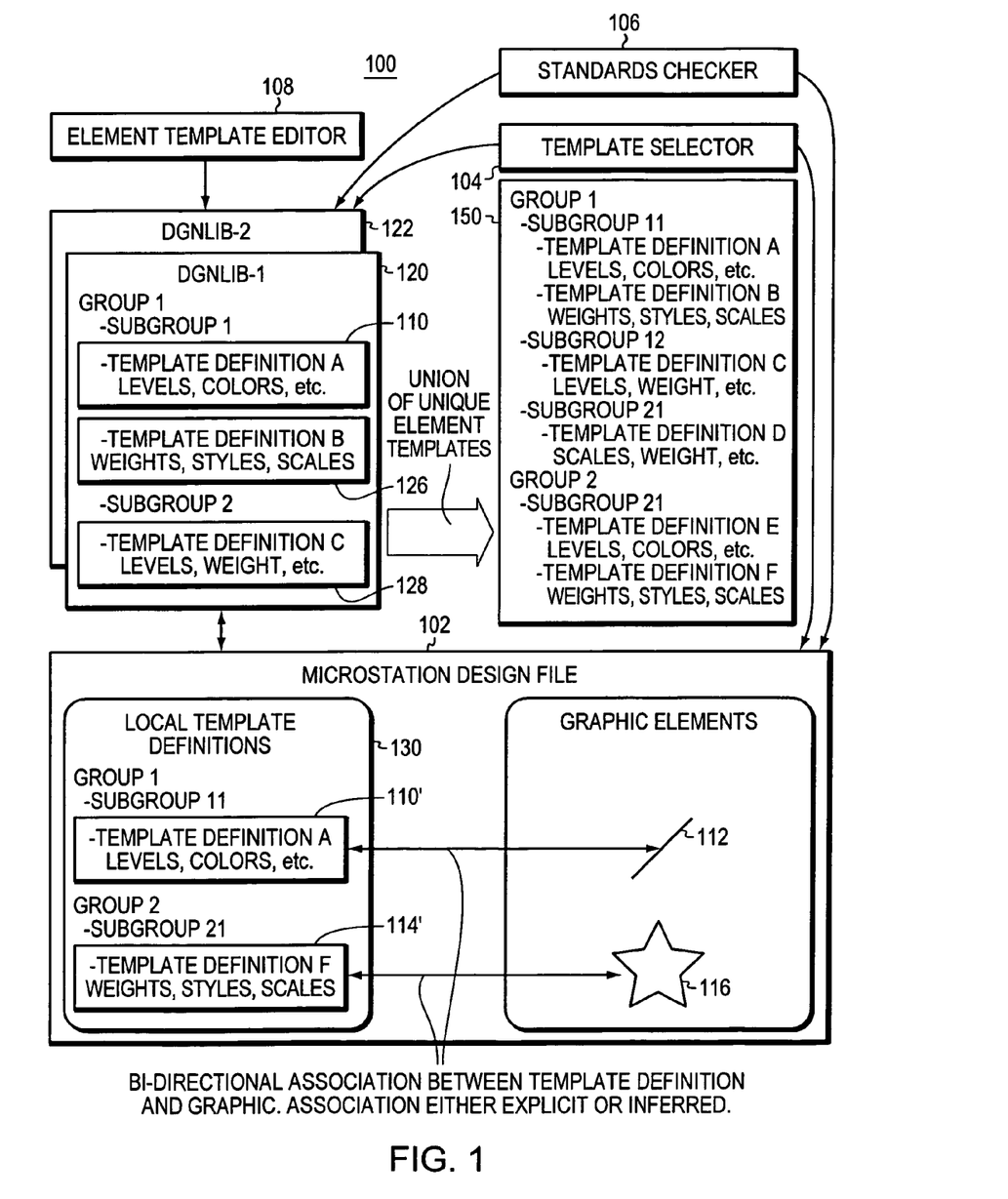
FIG. 1 is a schematic block diagram of an illustrative embodiment of the computer software program implementing the present invention.

FIG. 1 is a schematic block diagram of a CAD software platform 100 with which the software program of the present invention can be employed. The CAD system platform includes one or more Design Files 102 which contains graphic elements representing various components of the actual system or building being represented. The platform also includes a Template Selector 104 and a Standards Checker 106, which together allow settings to be chosen for drawing sessions and standards to be set and checked for the project being represented. Thus, the present invention can be used with a software platform that can be used to manage the design, construction and operation of AEC infrastructure projects. The platform with which the program of the present invention is described is, illustratively, the MicroStation® platform which is an AEC platform that is commercially available from Bentley Systems, Inc., of Exton, Pa. It should be understood, however, that the present invention is readily adaptable for use with other CAD platforms, and the invention is not limited to use with any particular CAD platform.

As noted, CAD programs display graphic elements which are visuals that represent the actual components in the project being designed and illustrated in the drawings. A component may be a pipe in a water distribution network, a gas line in a utility grid or an architectural wall in a building. A graphic representation of such a component is referred to herein as a "graphic element." CAD users typically display graphic elements which comply to a graphic standard such that the symbology properties used to display each graphic element conform to a standard set forth by the user, the project, or a particular company or municipality.

In accordance with the invention, the software program of the present invention employs a novel Element Template Editor 108, which is a software module for creating element templates which define symbology properties by which graphic elements are defined and thus represented in the drawings. An element template 110 is initially created using the Element Template Editor 108. The element template 110 is created and is stored in a DGN library 120. The DGN libraries are hereinafter referred to as a "DGNLIBs." The platform 100 contains a plurality of DGNLIBs, such as DGN-LIB 120 and DGNLIB 122 as illustrated in FIG. 1. The DGNLIB 120 contains multiple element templates, such as element template 110, element template 126 and element template 128.

The element templates 110 and 114 are copied from DGN-LIBs 120 and 122 to the design file 102 as element templates 110' and 114'. Element template 110' may specify the level, color, line weight, or other properties of the graphic element 112, in the design file 102. A different element template 114' defines the properties of a different graphic element 116. In accordance with the invention, there is an association between the template definition set forth in each element template 110' and 114', and the respective graphic element that it defines, such as the graphic elements 112 and 116, respectively. In accordance with the invention, this association can be either explicit or inferred.

As noted, local versions of the element templates are included in the design files 102 for the engineering system or building being represented. The element templates 110' and 114' were copied from the DGNLIB templates 110 and 114 when their respective graphic elements where placed in the file. It should be noted that the design file may contain multiple graphic elements associated to the same local template.

An element template such as the element template 110, stores a set of defined element properties for individual categories. For example, general properties such as level, color, line style, and line weight, as well as closed linear properties such as area, fill color, and fill type can be provided. Text styles and text style overrides, cell properties, point properties, pattern properties, multi line styles, dimensions styles, and materials can all be specified in one or more templates for that graphic element. Once the element templates have been created by the system administrator, they can be applied to existing graphic elements which are currently being used or can apply when new graphic elements are drawn. Only the template properties that apply to the graphic element type being processed are used to determine the symbology for that element. For example if the graphic element is a line then any defined text style or text style overrides properties are ignored.

Templates can be created in the open design file 102 as local template definitions 130. This type of element template is thus created in the open design file while the user is working with particular graphic elements. Alternatively, the element templates can be created while the user is working in a DGN-LIB, such as the DGNLIB 120. Further details about the configuration and operation of DGNLIBs are contained in commonly owned U.S. patent application Ser. No. 10/274, 117, filed on Oct. 21, 2002 for a SYSTEM AND METHOD AND COMPUTER PROGRAM FOR MANAGING CAD DATA, which is incorporated by reference herein in its entirety.

Graphic elements retain an association to an element template that was active when those graphic elements were placed in the drawing. This allows graphic elements that are associated an element template to be re-symbolized when properties in the element template are modified. If the element template was one that created and stored in an open DGN file 130, this means the associated graphic elements, 112 and 116 for example, will be re-symbolized automatically if properties in the element template 110' and 114' are modified.

Local Element Templates 110' and 114' may also be updated to match any changes that may have been made to their original element templates 110 and 114 in DGNLIBs 120 and 122. If the local element templates are updated then their associated element 112 and 116 are also updated to match the changes to the local element templates Element templates are stored in hierarchical groups such as Group 1 illustrated block 150 of the system 100. Group 1 contains a SubGroup 2 which includes template definition A, which was described before, and template definition B. It also includes a SubGroup 12 which includes template definition C, and SubGroup 21, which includes template definition D. By of further example, Group 2 contains SubGroup 21 which includes template definition E and template definition F. The element templates are stored in these hierarchical groups (Group 1 and 2) and these are known herein as "template groups." The element templates in template groups can be stored in an open design file 102 or in a DGNLIB 120.

To summarize, an element template allows a user to define a named set of element symbology properties. The element template is stored in a design file as a component of a template group. The template groups are stored in a design file and may be arranged hierarchically to assist in data organization as in folders on a disk drive. An element template is referenced by a path that includes the name of its parent group and its name separated by backslash characters. Templates are initially created and managed in DGNLIB files. Illustratively, an element template system is implemented in C++ and C# software, which is commercially available from Microsoft®. The base element parameters which can be used as properties for an element template in accordance with the invention are shown in Table 1:

Level
Color
Line-Style
Weight
Class
Transparency
Priority
Line-Style Scales
Line-Style Start Width
Line-Style End Width
Line-Style Shift Distance
Text Style
Text Height
Text Width
Text Font
Text Slant
Text Justification
Text Line Spacing
Text Character Spacing
Cell Name
Cell Scale
Terminator Name
Terminator Scale
Active Point Cell Name
Active Point Character
Active Point Type -continued Area Mode
Fill Mode
Fill Color
Hatch Spacing
Hatch Angle
X-Hatch Spacing
X-Hatch Angles
Area Pattern Cell
Area Pattern Scale
Area Pattern Spacing
Multi-line Style
Dimension Style
Material An element template 110 can contain 1 or more of the properties mentioned in Table 1. It should be understood that the invention is not limited to the properties shown in FIG. 1, and in fact many other items not specifically mentioned can be included as properties while remaining within the scope of the present invention.

Further in accordance with the invention, a property can be defined more than once. For example, if the property color is defined twice, the user sees two color entries: Color[0] and Color[1]. The property marked with a [0] is the default property entry. Any others are alternate property entries. If a graphic element matches one of the alternative property values, it is considered compliant with the standards set forth by the element template.

As shown in FIG. 1, the element templates 110' and 114' for example, are stored in the same file as the graphic elements 112 and 116 defined thereby. This local file copy 102 can be transmitted to another member of a design team by email, for example, or can be transported in a device such as a PDA, laptop, or pen computer. In this way, the local file copy of the element template allows the template definition to be used even if the software itself is disconnected from its original workspace files. For example, a contractor may email files containing the local template definitions and the graphic elements to a sub-contractor who is working on that particular aspect of the system. The sub-contractor can work from that file independently and does not need to connect to a separate database or workstation upon which the original design file was created. In addition, a designer can work with the design files in the field at the site, and does not have to be connected to a database which would otherwise be required in prior known systems.

Figure 2:
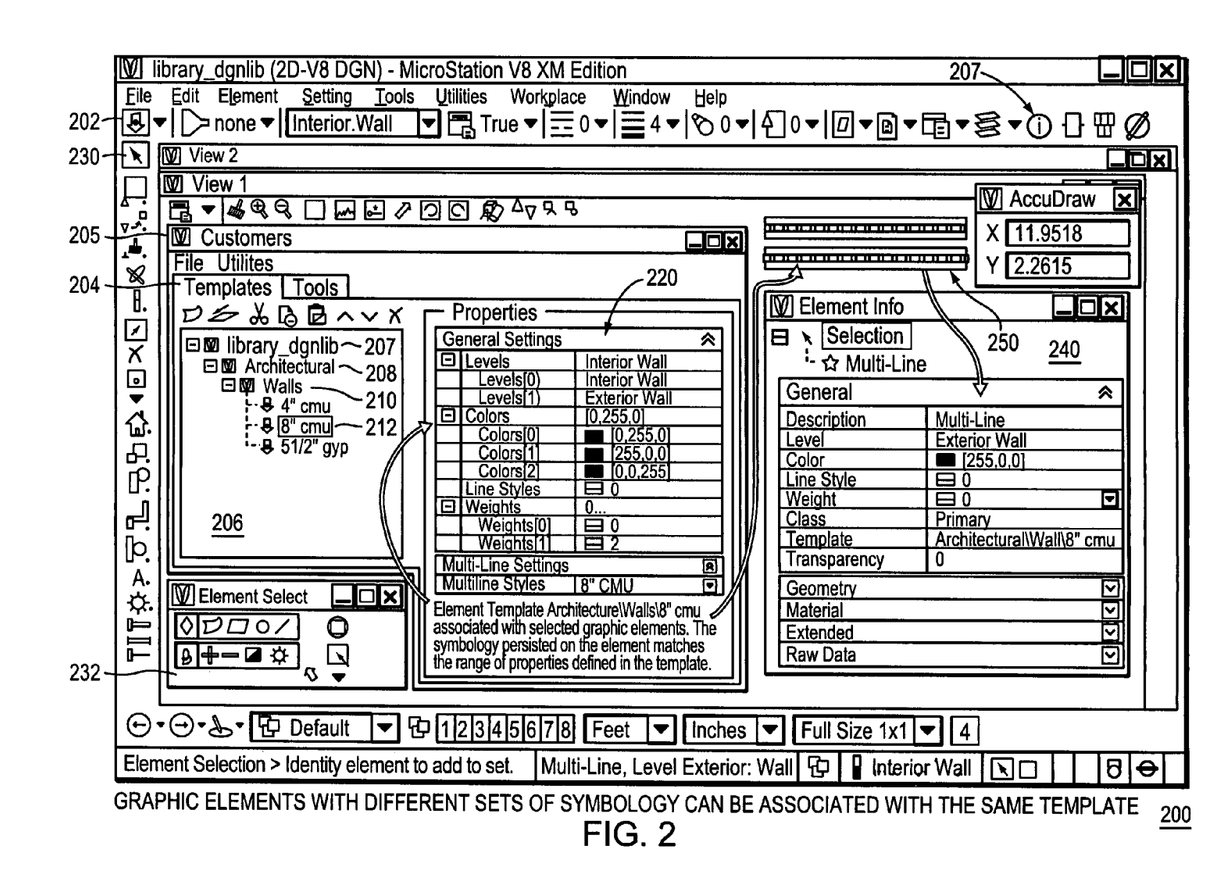
FIG. 2 is a screenshot generated by the software program of the present invention illustrating graphic elements with different sets of symbology being associated with the same template.

In order to further provide a better understanding of the invention, some specific illustrative examples will now be described. FIG. 2 is a screenshot generated by the software program of the present invention illustrating graphic elements with different sets of symbology being associated with the same template. The screenshot 200 contains a Template Selector button 202 which allows an element template to be selected (see drop down list 401 in FIG. 4). The Customize window, 205, shows the template directory tree 206, which displays all the available element templates in tab 204 that are stored in the DGN library 207, in an Architectural folder 208, and within the Wall subfolder 210. The specific template is one that describes the symbology properties for the graphic element that represents an 8 inch concrete masonry unit CMU wall 212. The properties pane 220 contains the symbology properties to be applied to one or more graphic elements. Thus, the element template, 204, having a path Architectural\Walls\8" CMU defines the symbology properties as set forth in the properties pane 220. Notably, the properties can be one of a range of properties defined in the template. For example, the colors of the graphic element can be one of the three colors specified. This is in contrast with prior art techniques in which only one specific property can be associated with a particular element.

Further in accordance with the invention, the element template 204 Architectural\Walls\8" CMU is associated with a selected graphic element. The graphic element can be initially selected by selecting the button 230, which brings up the Element Selection box 232. After selecting the graphic element the Element Information tool 207, can be used to open window 240. Information about the selected graphic element is shown in the Element Info window 240. The symbology persisted on the graphic element set forth in the General properties of window 240 matches the range of properties defined in the list 220 in the element template 204. Furthermore, the element template 204, i.e., Architectural\Walls\8" CMU is associated with the selected element 250 and the symbology persisted on the highlighted element matches the range of properties defined in that element template.

If element 250 was placed or imported without an association linkage to the element template, the proper template path would still be shown in the Element Info window, 240, because the software program of the present invention will automatically infer that the symbology of element 250 matches the properties defined by element template 204 namely Architectural\Walls\8" CMU. An association linkage is typically preferable over inferring the association between a graphic element and its template definition. Sometimes this is not possible or desirable if the drawing file is from a CAD software platform that does not support the element template functionality.

Figure 3:
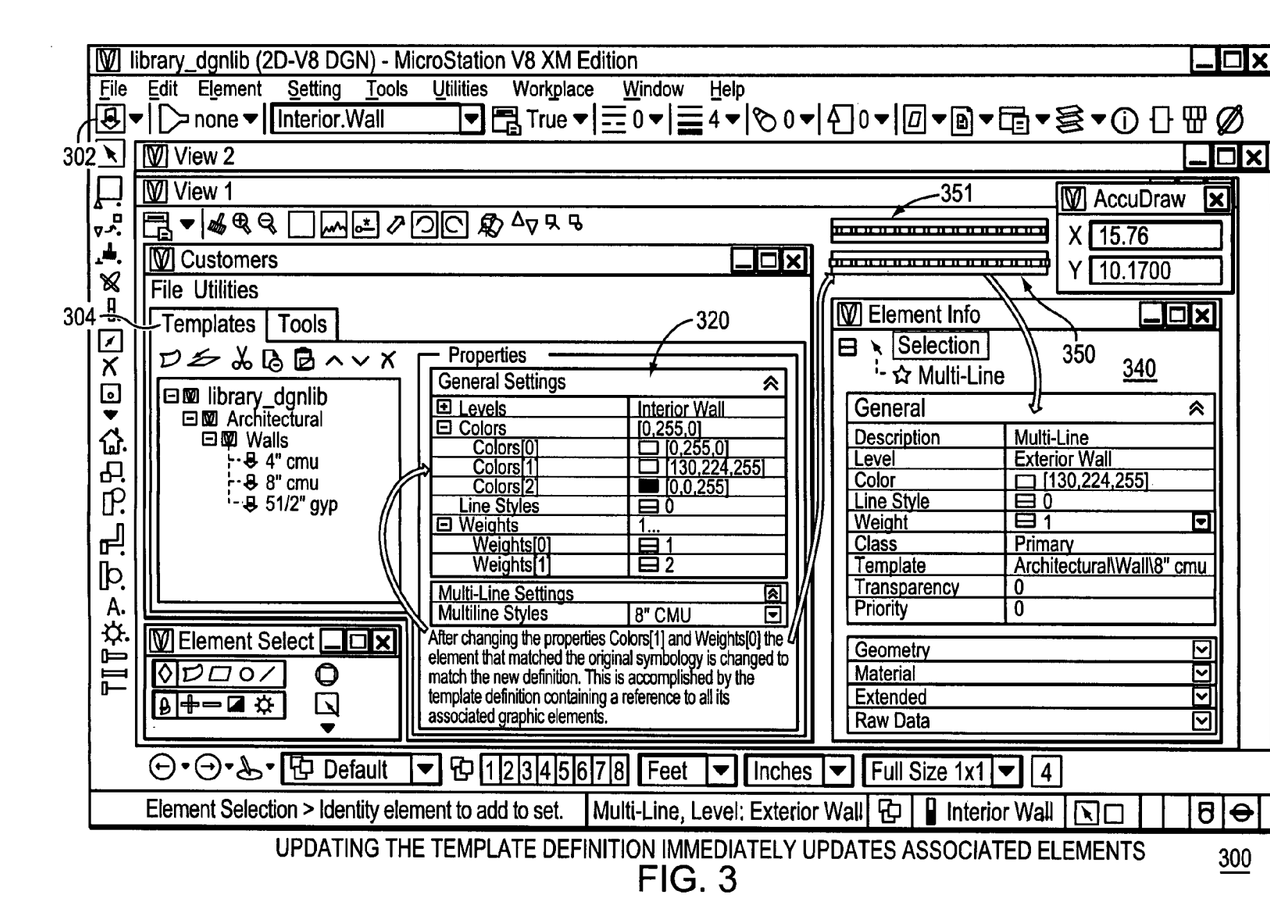
FIG. 3 is a screen shot generated by the software program of the present invention illustrating updating associated elements when the template definition is updated.

FIG. 3 is a screen shot generated by the software program of the present invention illustrating updating associated elements when the template definition is updated. The screen shot 300 shows that when the properties in the property pane 320 are updated, element 350, that matched the original element template definition is automatically updated to match the new properties. It is important to note that both elements 350 and 351 are associated to the element template Architectural\Walls\8" CMU. Thus, after changing the properties containing Colors[1] and Weights[0] only the graphic element 350 that matched the original property values for Colors[1] and Weights[0] is changed to match the new definition, as shown in Element Info window 340. This is accomplished by the template's definition containing a reference to its associated graphic elements. Because graphic element 351 matched Colors[0] and Weights[1] and those property values where not changed the element was also left unchanged.

Figure 4:
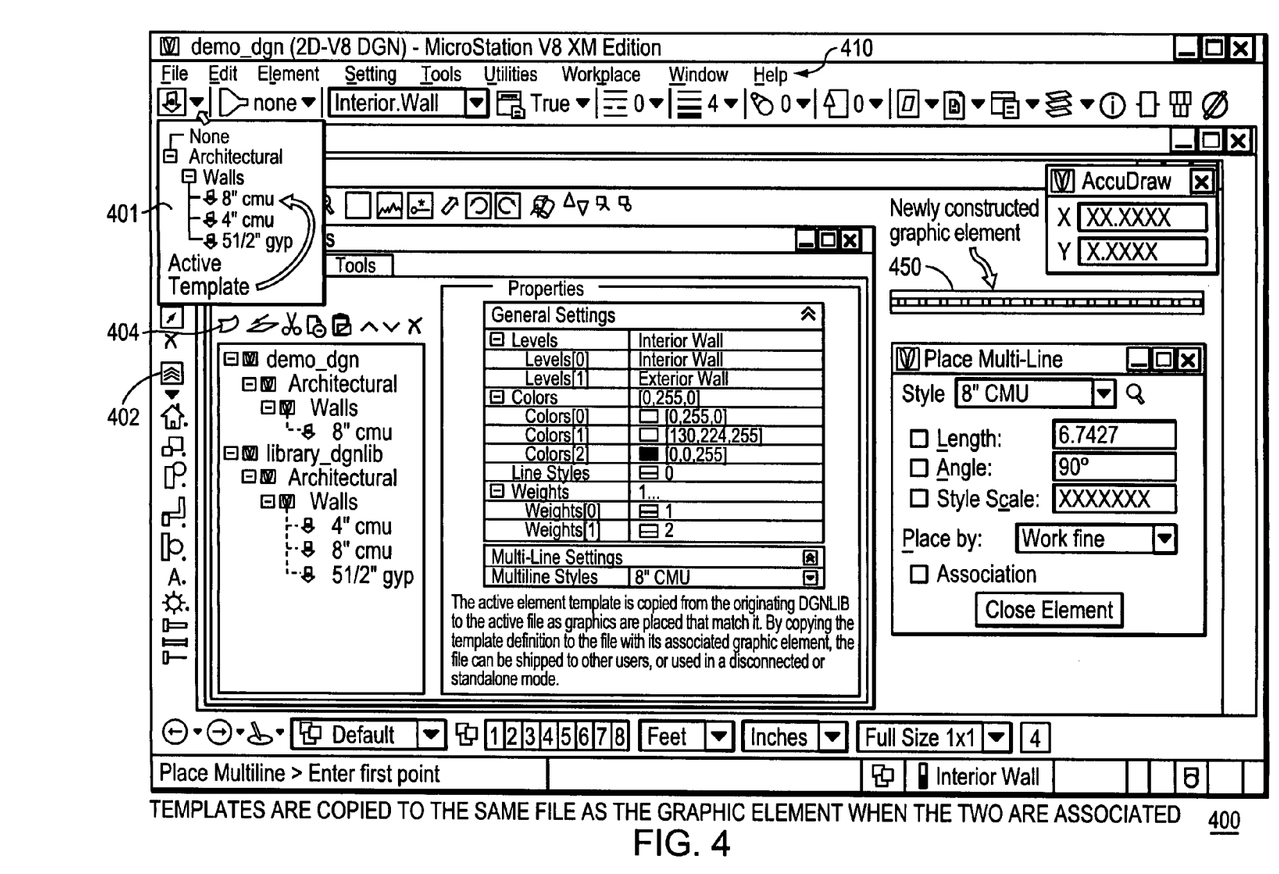
FIG. 4 is a screen shot generated by the software program of the present invention illustrating element templates being copied to the same file as the graphic element with which it is associated.

FIG. 4 is a screen shot generated by the software program of the present invention illustrating element templates being copied to the same file as the graphic element with which it is associated. The screen shot 400 includes a pull-down window 401 allowing the user to set Active Element Template to the template described by the path Architectural\Walls\8" CMU. Once the element template is made active, the place multi-line tool, 402 is used to create the graphic element 450. Once the element is placed the Customize window 404 is opened to show that the active template was copied from the DGNLIB library.dgnlib, 405, to the local file demo.dgn, 406 as the element that matches its symbology is placed. The Customize window is opened using menu 410 and selecting the entry Workspace>Customize. By copying the element template from the DGNLIB to the design file with its associated graphic element, the design file can be shipped to other users, sub-contractors or used in a disconnected or stand alone mode such as in a handheld PDA, pen computer or laptop out in the field.

Figure 5:
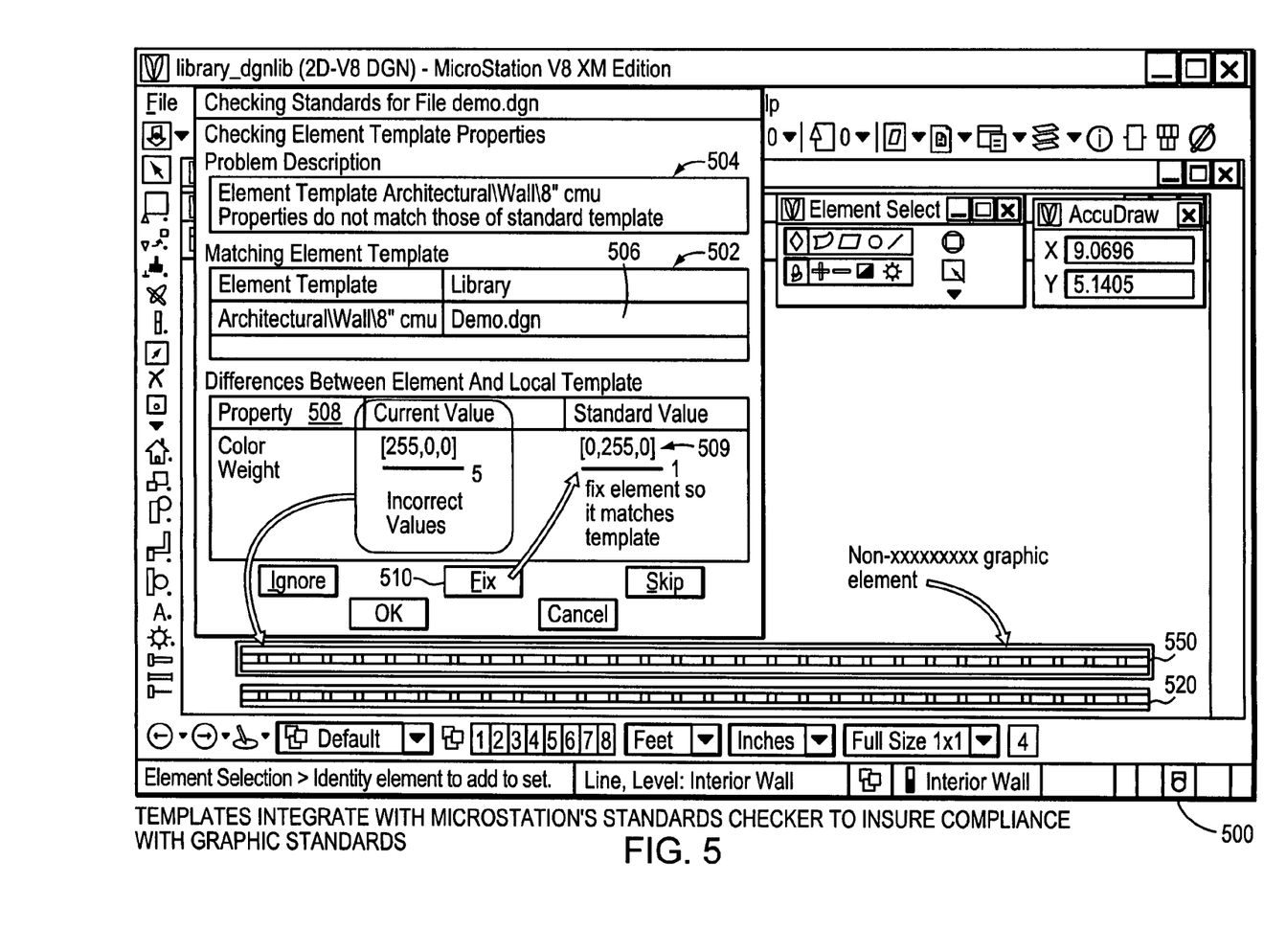
FIG. 5 is a screen shot generated by the software program of the present invention illustrating element templates integrating a standards checker to ensure compliance with graphic standards.

In accordance with another aspect of the invention, the element templates can be used with the Standards Checker 106 (FIG. 1) to ensure compliance with graphic standards. As shown in the screenshot 500, a Standards Checker dialog is illustrated by the Checking Standards for File window 502. The Standards Checker is being used to check the highlighted graphic element 550 for compliance with the applicable graphic standard. The window 502 includes a Problem Description 504 such as, "Element Template Architectural\Walls\8" CMU Properties do not match those of standard template." In the subwindow 506 the relevant element template is identified. The window 508 specifies the differences between the placed graphic element and the element template. In the example, the color and the weight are non-compliant. A list of suggested corrections is made 509, and a compliant graphic element 520 is shown as an example. A fix button 510 allows the user to automatically fix the graphic element so that it does comply with the standards set forth by the element template 502, which covers that graphic element. Thus, using this capability, graphic elements may be checked to see if they comply with a defined graphics standard and elements which are out of compliance can be fixed and brought back into compliance.

Figure 6A:
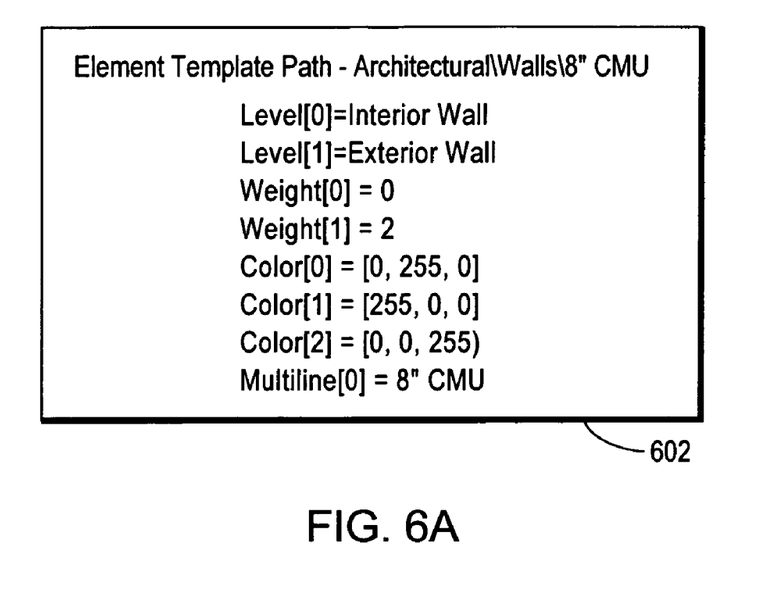
FIG. 6A is a block diagram of an element template in accordance with an illustrative embodiment of the present invention.

To summarize, element templates provide the ability to store multiple values for symbology properties of graphic elements. For example, FIG. 6A is a block diagram of an element template in accordance with an illustrative embodiment of the present invention. The element template 602 is a named set of defined properties including, but not limited to, compliant levels, line weights, color RGB values, and line style for the graphic element 8" CMU wall. The name of the set of properties is referred to as the element template path. In accordance with the invention, any graphic element that matches any combination of the available levels, weights, and colors with a multi-line style is associated with the element template Architecutural/Walls/8" CMU.

Figure 6B:
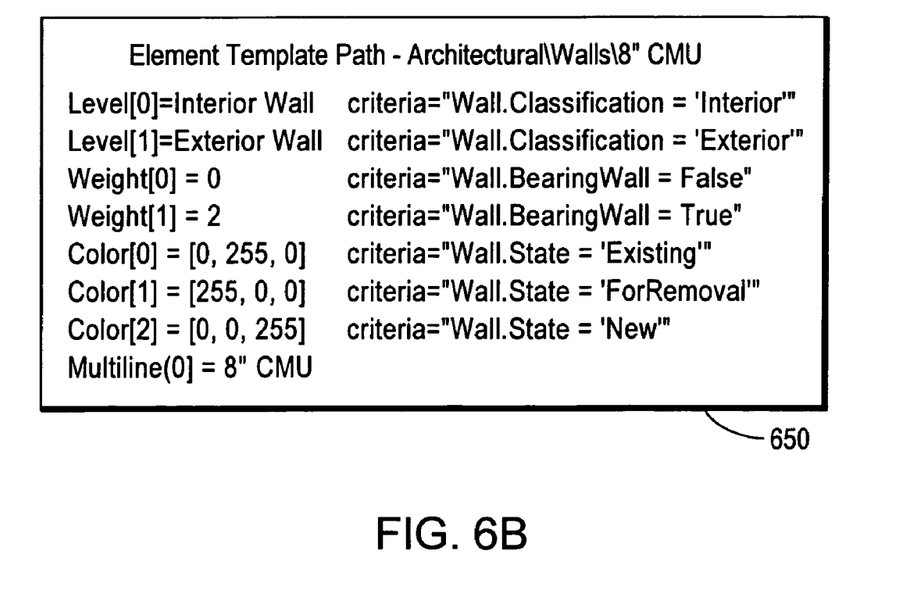
FIG. 6B is a block diagram of an element template in accordance with an illustrative embodiment of the present invention where element attribute criteria are incorporated into the template property definitions.

FIG. 6B is a block diagram of an element template in accordance with another aspect of the present invention wherein criteria can optionally be incorporated into the template property definitions. As illustrated in FIG. 6B, when criteria are used in element templates they limit the valid symbology property combinations by providing criteria expressions to property values. In examples shown in FIG. 6B, the criteria expressions 610 compare component specific attributes that can be supported by MicroStation's® ECExpression Evaluator to determine the proper combination of symbology properties for the graphic element. The context used to evaluate the expressions is based on the graphic element being processed. It should be understood by those skilled in the art that other CAD-based applications can publish their application specific element attributes to the ECExpession Evaluator showing that the present invention can be readily used with these other programs.

It is also noted that element templates can be used to recognize their relationship to graphic elements in a design file that do not explicitly define their element template association. Once the relationship is determined the user can use the present invention to explicitly associate graphic elements to element templates, which in turn adds intelligence to the design file. This allows existing elements from CAD systems that do not support element templates to be recognized by the element templates technology in accordance with the present invention. This can also be used to ensure that these graphic elements comply with the appropriate graphic standards. If the user does not want to associate the graphic element to its "matching" template, he or she will still have the ability to place, select, and check elements by its "matching" element template. This matching capability relies on the ability of templates to store not just one particular property but multiple values which was described herein with reference to FIG. 2. The element template system has the ability to limit to symbology property selections during element creation to values allowed by the template. For example if the element template 602, in FIG. 6A, is being used to define a new element, only those colors, levels and weights which are provided by that template are available for selection by the user when creating the new element. Thus, the user can not create an element which does not comply with the standards. The user is confined to property values allowed by the element template.

The element template definitions which are stored in DGN library files as described herein can also be subject to the security that is already provided in a DGN library files as set forth in the above-incorporated U.S. patent application Ser. No. 10/274,117, which provides further details with respect to the DGN library files. This security can be implemented using system level file protection and/or by using digital rights technology supported by the CAD system being used such as the MicroStation® Design File Program. As noted herein, sets of element templates can be made available at the site, project or user level by properly configuring the workspace configuration variables with the appropriate list of DGN library files containing the relevant template definitions.

Figure 7:
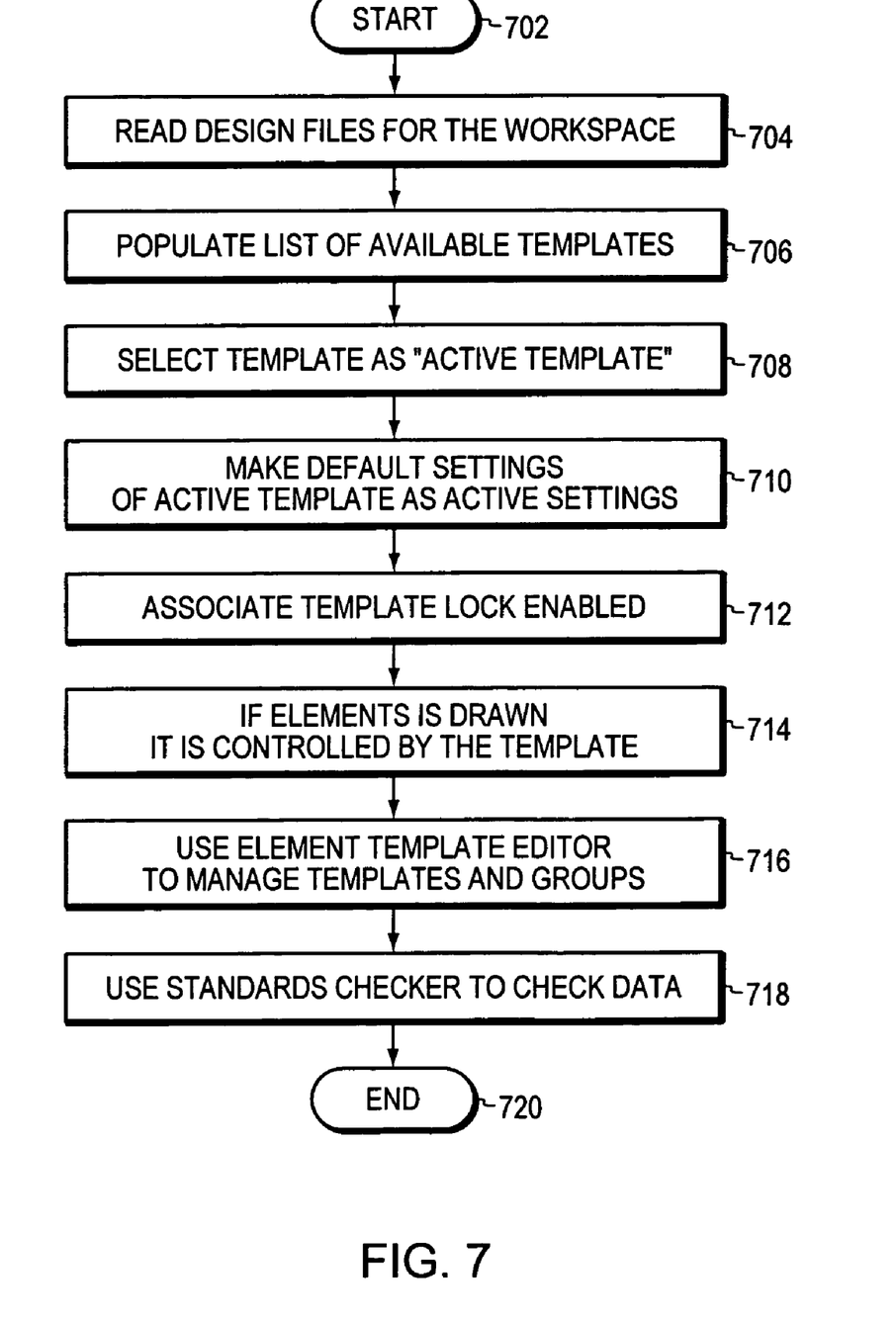
FIG. 7 is a flow chart of a procedure in accordance with the method of the present invention.

By way of further illustration, FIG. 7 provides a flow chart 700 of a procedure which is employed in accordance with the method of the present invention. The procedure starts at step 702 and continues to step 704. Thus, when a design session starts, the design files defined by the workspace are read, as in step 704. A list of available templates is then populated as shown in step 706. The order of files in the list controls the precedence in which an element template is located. An element template from the list of available templates is selected and becomes the active element template as shown in step 708. The default settings of the active element template are made active. If an associate template lock is enabled, any newly placed elements are associated with the active template, as shown in step 712. When elements are associated with templates, either at placement or during subsequent operations, the associated template, together with all its associated template groups are copied into the current design file, if not already present. This insures that the properties of an associated element template are always available.

Thus as shown in step 714, if an element has been drawn, its symbology is controlled by the element template and conforms to the standard set forth in that template. As shown in step 716 the Element Template Editor 108 (FIG. 1) is used to manage templates and groups. The Element Template Editor honors any digital rights of each file that contains templates. If a file allows it, then template properties can be added, removed and changed. Any changes are applied to the graphic elements associated with the template automatically. The Element Template Editor also provides options to import template data from properly formatted XML. Template data can also be exported to XML formatted files. As shown in step 718, the Standards Checker 106 provides two levels of checking for element template data. The first is to test the local copy of the template definition against the library template definition. The second is to test all elements against their associated local template. Any properties that do not match are shown as errors. The user can skip the error, ignore the error or allow the Standards Checker to fix the error as was described with reference to FIG. 5. The procedure ends at step 720.

It should be appreciated that the present invention provides a system for persisting a relationship between a graphic element and a properly protected named set of graphic symbology properties that define user, project, and/or client graphic standards. The vehicle for providing this relationship is an element template. The element template system of the present invention does not replace existing style systems; instead the element template system allows such systems to work together. The properties in a template may specify style names to activate or apply when the element template is activated or applied. The appropriate styles from the associated element template are applied based on the graphic element type, text styles to text element, dimension styles to dimension elements and so on. Future CAD-based application can employ the template technology to store application specific element symbology in a DGNLIB. This would allow both the application and users that are not running the application to share the same graphic standards.

As noted, element templates can define standards and can be made available to sub-contractors to insure that drawings are produced according to established standards. This allows sub-contractors to quickly switch between in-house and client specific graphic standards. Design files that employ the element template technology can be easily transported between sub-contractors and client using email since these files do not require a connection with an underlying database in order to search symbology tables for relevant property values. In addition, the inventive element templates allow a fuller range of properties to be defined and associated with graphic elements in accordance with a desired set of standards. These standards can then be checked for compliance.

The forgoing description has been directed to specific embodiments of the invention. It will be apparent; however, that other variations and modifications may be made to the described embodiments with the attainment of some or all of the advantages of such. Therefore, it is the object of the appended claims to cover all such variations and modifications as come within the true spirit and scope of the present invention.

What is claimed is:

1. A system for visually representing a project using graphic elements, comprising:
    a computer having a display, the computer configured to execute program instructions, the program instructions including program instructions for:
        a plurality of design libraries which store element templates that include symbology properties which govern graphic symbology for use with each type of graphic element being represented in the system, each type of graphic element corresponding to items or components within an engineering system or structure being modeled;
        an element template editor which allows the element templates stored in the design libraries to be created, edited, deleted, or modified; and
        active files which contain graphic elements placed by a user, and further contain local versions of element templates associated with each graphic element in that active file.

2. A system for visually representing a project using graphic elements, comprising:
    a computer having a display, the computer configured to execute program instructions, the program instructions including program instructions for
    a standards checker configured to:
        compare a graphic element with a graphic standard set forth in an associated element template that describes that graphic element,
        compare a local element template with a template in a design library, determine whether the graphic element complies with the graphic standard set forth in the associated element template,
        issue instructions to a user about whether the graphic element as displayed is in compliance with the graphic standard set forth in the associated element template,
        determine whether the local element template matches the design library template, and
        issue instructions to a user when the local element template does not match the design library element template.

3. A non-transitory computer readable medium for use with a computer aided design program, including program instructions for performing the steps of:
    creating one or more element templates which include symbology properties defining the graphic presentation of particular graphic elements when displayed, the particular graphic elements representing items or components within a particular project being modeled;
    storing the element templates in one or more design libraries, as well as in one or more local design files usable for the particular project;
    reading one or more design files defined for the particular project that contain one or more element templates associated with that project;
    populating a list of available element templates in a predetermined order;
    selecting an element template as an active element template;
    using default settings of the active element template as active settings; and
    drawing an element which is thereby controlled by the element template.

4. The non-transitory computer readable medium as defined in claim 3 including program instructions for performing the further steps of using an associated element template editor to perform one or more of the following: manage templates, edit templates, modify templates, and form various ones of the templates into groups.

5. The non-transitory computer readable medium as defined in claim 4 including program instructions for performing the further step of using an associated standards checker to check the graphic elements displayed to determine whether those graphic elements displayed comply with applicable graphic standards for a workspace.

6. The non-transitory computer readable medium as defined in claim 3 including program instructions for performing the further step of inferring, from a displayed graphic element, an element template which sets forth the properties by which that graphic element is to be defined.

7. The non-transitory computer readable medium as defined in claim 3 including program instructions for performing the further step of applying properties of an element template to a newly constructed and existing graphic elements.

8. A computer-implemented method for providing a set of graphic symbology properties for graphic elements, comprising:
    reading a design file that includes a particular set of graphic elements from a computer-readable medium, the graphic elements representing items or components within an engineering system or structure being modeled;
    configuring an element template which includes a set of symbology properties for the particular set of graphic elements, the symbology properties defining the graphic presentation of the particular set of graphic elements when displayed;

applying the symbology properties of the element template to the particular set of graphic elements; and storing a copy of the element template in the same design file that includes the particular set of graphic elements.

9. The computer-implemented method as defined in claim 8, further comprising:

storing the element template in a library accessible to a user; and copying the element template from the library to the same design file that includes the particular set of graphic elements.

10. The computer-implemented method as defined in claim 8, wherein configuring an element template further comprises:

populating a list of available element templates; and receiving a selection of a particular element template to use as an active element template.

11. The computer-implemented method as defined in claim 10, wherein configuring an element template further comprises:

placing graphic elements of the particular set of graphic elements; and associating the placed graphic elements with the active element template.

12. The computer-implemented method as defined in claim 8 wherein the symbology properties comprise one or more of linear properties, text properties, cell properties, point properties, and pattern properties for graphic elements.

13. The computer-implemented method as defined in claim 8 wherein the symbology properties comprise one or more of a color, a line style, a line weight, a fill color, and a fill type for graphic elements.

14. A computer-implemented method for visually representing a project using graphic elements, comprising:

comparing a local element template with a template in a design library;

determining whether the local element template matches the template in the design library;

notifying a user when the local element template does not match the template in the design library;

comparing a graphic element with a graphic standard set forth in the local element template that describes the graphic element;

determining whether the graphic element complies with the graphic standard set forth in the local element template; and notifying a user when the graphic element is not in compliance with the graphic standard set forth in the local element template.

* * * * *